May 3, 1960  L. M. C. SEAMARK  2,935,342
PIPE COUPLING WITH CAM TIGHTENING MEANS
Filed Oct. 19, 1955  2 Sheets-Sheet 1

United States Patent Office 2,935,342
Patented May 3, 1960

2,935,342

PIPE COUPLING WITH CAM TIGHTENING MEANS

Lewis Mervyn Cecil Seamark, Pyne Cliff, Lyme Regis, Dorset, England

Application October 19, 1955, Serial No. 541,444

6 Claims. (Cl. 285—90)

The invention relates to pipe-couplings.

According to the invention, the coupling is formed by a gripping member mounted at a determined position at or near the end of each of the pipes to be coupled, and a cylindrical locking ring mounted to span the joint between the ends of the pipes, and adapted to engage the gripping members on the ends of the pipes to prevent axial withdrawal of the pipe ends from the coupling and to provide a fluid and pressure tight seal at the joint between the pipes.

The gripping members may each be formed as a clamp having an arcuate part surrounding the pipe and a pair or pairs of radially extending co-operating bosses or lugs at the ends of the arcuate part bored to receive a screw bolt or the equivalent, whereby pressure may be applied to bring the ends of the arcuate part into closer engagement and thus tighten the clamp around the ends of the pipe. On the inner surfaces the gripping members may be formed with a friction lining such as a rubber or like substance, or with teeth or serrations.

On the outer peripheral surface, the gripping members may be formed with a circumferential series of clutch members or dogs with tapered or inclined faces adapted to be passed through gaps formed at corresponding positions in the end faces of the locking ring and then to be twisted through an angle, so that the clutch members or dogs engage frictionally in recesses of corresponding form, provided in the ring.

A positive lock in the form of a radially extending pin or bolt may be provided to pass through a hole in the locking ring and between the clutch members or dogs of the gripping member.

The locking ring is formed to leave an annular space to surround the projecting ends of the pipe and with an inwardly projecting annular flange at a middle position and serving as a confining element for a sealing ring packing which are mounted in the spaces so formed on each side of the annular member. The packing may be a resilient packing material such as rubber or the like.

The invention further comprises the features of construction hereinafter described.

The invention is diagrammatically illustrated by way of example in the accompanying drawings, in which.

Figure 1:
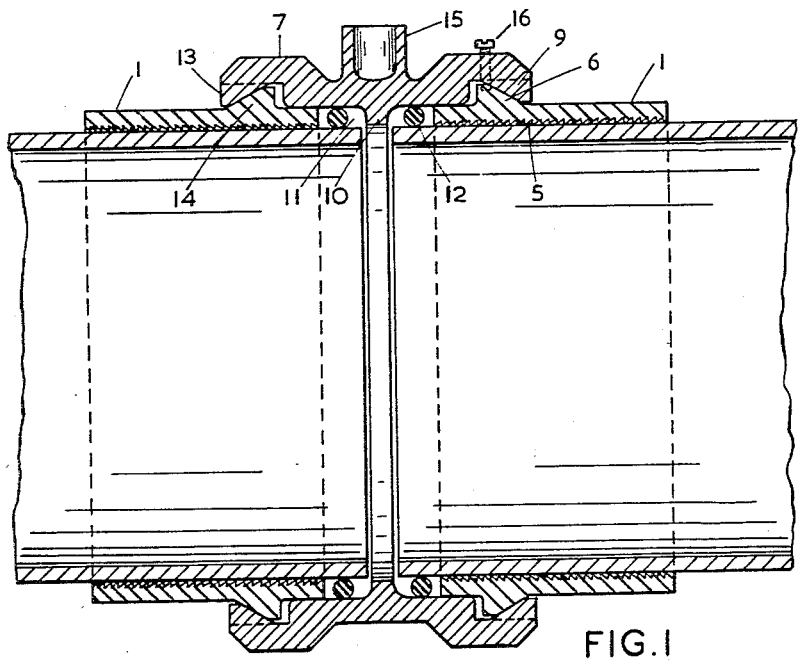
Figure 1 is a sectional side elevation.
Figure 2:
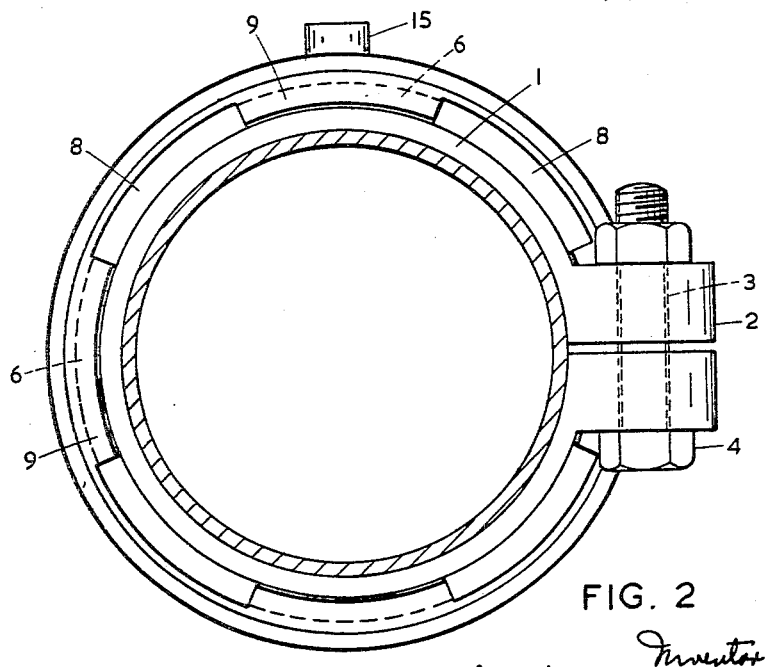
Figure 2 is a corresponding end elevation.

In carrying the invention into effect according to the construction illustrated in Figures 1 and 2 of the drawings, the pipe coupling for clamping together the ends of two pipes comprises gripping members 1 each of angular form and provided as a circular strap, with adjacent ends of the strap formed with radially extending lugs or bosses 2 and bored at coincident positions at 3 to receive a screw bolt, pin or the like 4. To assist in preventing withdrawal of the pipes in an axial direction, the inner surface of the circular strap is formed with teeth or serrations 5 formed to grip into the pipe on tightening of the bolts or pins 4.

The gripping members or straps 1 are mounted on the pipes at a determined distance from the ends so as to leave the projecting ends of the pipes unencumbered.

On the outer periphery of each gripping member 1 is formed a circumferential series of outwardly projecting clutch members or dogs 6 angularly spaced around the member 1 (Figure 2) at a position near to but spaced from the inner end face of the gripping member.

Provided to span the ends of the pipes at the joint and to engage the gripping members 1 mounted on the pipes, in the manner of a bayonet joint, is a locking ring or cylinder 7 formed as an integral unit of two identical halves. The locking ring 7 is formed with angularly spaced gaps 8 at corresponding positions at the respective ends to receive the dogs or clutch members 6 of the gripping members 1, and with recesses 9 on the inner peripheries of a form corresponding to that of the dogs or clutch members 6, for example, tapered, so that on relative rotation of the gripping members 1 and the locking ring or cylinder 7 the parts are held in positive engagement.

At the middle of the ring 7 on the inner surface is provided an inwardly extending annular partition member 10, and in the spaces 11 provided one on each side of the partition member 10 and each delimited by the end face of the gripping member 1, the inner surface of the locking ring 7, the outer surface of the projecting unencumbered end of the pipe, and a side face of the annular partition member 10, is mounted a sealing ring 12 of rubber, or like substance.

The locking ring 7 is mounted on the ends of the tubes so as to leave considerable tolerances at the end faces, whereby the pipe ends may be effectively coupled even with the pipes positioned, as when passing round a bed or over uneven ground, at an angle to each other.

As illustrated the ring 7 may be formed at each outer end face with a downwardly extending annular rim 13 cut back on the inner face to an angle of about 30° to the horizontal so as to engage with a correspondingly angled part 14 of each clutch member or dog 6.

On the outer periphery of the ring 7 a boss 15 may be formed with a cylindrical recess to receive the end of a tommy bar for applying a rotational movement to the ring when mounting it in position or when undoing the joint.

In mounting the coupling, the gripping members 1 are disposed one on each end of the pipes to be coupled at a determined distance from each end of the pipe to leave projecting ends, and the gripping members tightened on the pipes by screwing up the nuts on the screw bolts 4 to cause the teeth on the under surface of the gripping members to bite into the outer peripheral surfaces of the pipe ends.

Rubber sealing rings 12 formed to a diameter slightly greater than the height of the space between the undersurface of the ring 7 and the outer periphery of the projecting end of the pipe are then mounted on the unencumbered ends of the pipes to be coupled.

The ends of the pipes so fitted with gripping members are then engaged by the locking ring 7 which is partly rotated as by means of a tommy bar to cause engagement of the dogs or clutch members 6 in the recesses or slots in the locking ring.

Positive locking together of the gripping members and the locking ring may be effected by means of a set screw 16 or by similar means.

Figure 3:
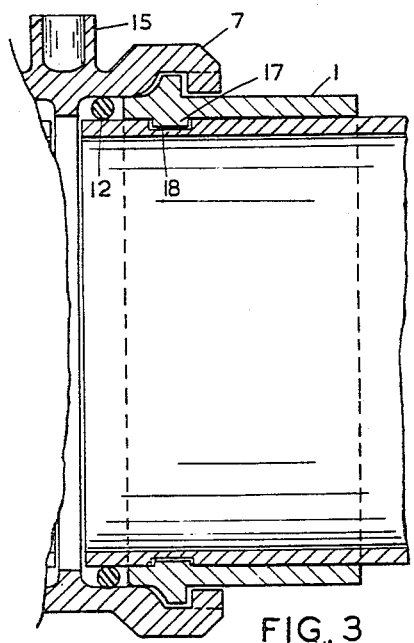
Figure 3 is a part sectional side elevation of a modified construction.

In a modified construction, as illustrated in Figure 3 of the drawings, the inner peripheral surfaces of the gripping members may be formed with an annular ring or rings 17 of, for example, rectangular section adapted to be received in a recess or recesses 18 of corresponding form provided at the appropriate positions in the outer peripheral surfaces of the pipe ends to be coupled.

The gripping members 1 may be formed in two halves, secured together as by bolts or the like advantageously at two diametrically opposite positions.

Figure 4:
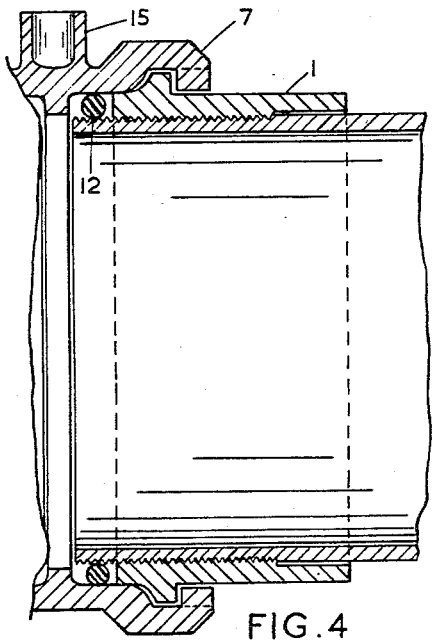
Figures 4 and 5 are sectional side elevations of modified constructions of the gripping member and its method of attachment to the ends of the pipes to be coupled.

In the modified construction illustrated in Figure 4 of the drawings the gripping members are screw-threaded on the undersurface for part of their length for engagement with the correspondingly screw-threaded end of the pipe to be coupled, the gripping member in such case being formed as a complete ring to surround the end of the pipe to be coupled.

Figure 5:
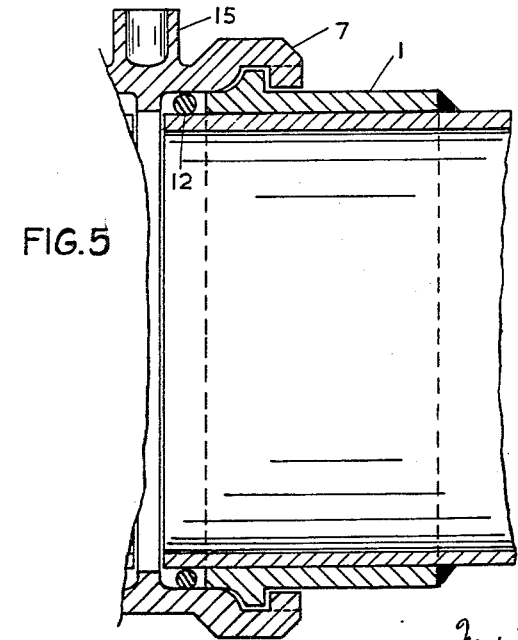

In the modified construction illustrated in Figure 5, the gripping members are welded to the ends of the pipes to be coupled. The gripping members may alternatively be shrunk on to the ends of the pipes.

The coupling may be made of metal, such as steel, or of a plastic. It is particularly adapted for use as a coupling for plastic piping, which may be made anti-corrosive, in which case the coupling may also be made of the same material.

No limitation is, however, made as to the material from which the coupling may be made.

I claim:

1. In a coupling device for pipes comprising a separate substantially cylindrical, split ring gripping member to be mounted on each end of the pipes to be coupled, means for tightening each gripping member to each end of the pipe to be coupled, each of said gripping members being provided with at least one upstanding projection, said projections being substantially transverse with respect to the axial alignment of said gripping members with the free end of each projection extending outwardly with respect to said gripping members, and a substantially cylindrical locking ring for engaging the respective ends of said gripping members, the inner periphery of the opposite ends of said locking ring provided with one recess, each being in substantially cylindrical alignment with each upstanding projection, whereby upon relative rotation of the locking ring and the gripping members, the upstanding projections will engage the respective recesses of the locking ring to lock the gripping members in tight engagement with the locking ring, the respective engaging surfaces of said upstanding projections and said recesses of said locking ring being inclined to provide a wedging effect so that an increase in axial load on the pipes increases the inward radially directed pressure of the locking ring on the pipe ends.

2. A coupling device according to claim 1, including an inwardly extending partition member on the inner periphery of said locking ring defining at one side a space confined at the other sides between the inner surface of said locking ring the outer periphery of the ends of the pipe, and the inner end face of said gripping member for the reception of a sealing ring packing made of a resilient material.

3. A coupling device according to claim 1, in which the ends of the locking ring are formed with inwardly extending flanges with an inner face cut away at an angle of 30° to the horizontal to engage with similarly angled outwardly projecting parts formed on the gripping members.

4. A coupling device according to claim 1, including means for rotating the locking ring relatively to the pipe gripping members.

5. A coupling device according to claim 1, in which the gripping members are formed on the inner peripheral surfaces with outwardly projecting rings adapted to be received in annular grooves formed at corresponding positions in the outer peripheral surfaces of the pipes to be coupled.

6. A coupling device according to claim 1, including means for locking said locking ring to said gripping members.

References Cited in the file of this patent

UNITED STATES PATENTS

| | | |
|---|---|---|
| 179,815 | O'Neill | July 11, 1876 |
| 228,209 | Meier | June 1, 1880 |
| 711,946 | Day | Oct. 28, 1902 |
| 822,423 | Bates | June 5, 1906 |
| 1,097,508 | Bailey | May 19, 1914 |
| 1,789,379 | Dillon | Jan. 20, 1931 |
| 2,187,217 | Winslow | Jan. 16, 1940 |
| 2,451,354 | Ohls | Oct. 12, 1948 |
| 2,452,278 | Woodling | Oct. 26, 1948 |
| 2,627,429 | Engelman | Feb. 3, 1953 |
| 2,703,722 | Christophersen | Mar. 8, 1955 |
| 2,738,993 | Wilson | Mar. 20, 1956 |
| 2,755,109 | Risley | July 17, 1956 |

FOREIGN PATENTS

| | | |
|---|---|---|
| 286,964 | Switzerland | Mar. 2, 1953 |
| 312,413 | Italy | Nov. 14, 1933 |
| 861,123 | France | Feb. 1, 1941 |